United States Patent
Takahira et al.

(10) Patent No.: US 9,260,639 B2
(45) Date of Patent: Feb. 16, 2016

(54) POLYESTER ADHESIVE COMPOSITION

(75) Inventors: Hitoshi Takahira, Osaka (JP); Satomi Yoshie, Osaka (JP); Miki Tanimura, Osaka (JP)

(73) Assignee: NITTO DENKO CORPORATION, Osaka (JP)

(*) Notice: Subject to any disclaimer, the term of this patent is extended or adjusted under 35 U.S.C. 154(b) by 612 days.

(21) Appl. No.: 13/519,386

(22) PCT Filed: Dec. 27, 2010

(86) PCT No.: PCT/JP2010/073632
§ 371 (c)(1),
(2), (4) Date: Jun. 27, 2012

(87) PCT Pub. No.: WO2011/081163
PCT Pub. Date: Jul. 7, 2011

(65) Prior Publication Data
US 2012/0301717 A1    Nov. 29, 2012

(30) Foreign Application Priority Data
Dec. 28, 2009    (JP) ................................. 2009-298391

(51) Int. Cl.
*C09J 7/02* (2006.01)
*C09J 167/02* (2006.01)
(Continued)

(52) U.S. Cl.
CPC .............. *C09J 167/02* (2013.01); *C09J 7/0207* (2013.01); *C09J 163/00* (2013.01); *C09J 167/00* (2013.01); *C09J 167/08* (2013.01); *B32B 7/04* (2013.01); *B32B 7/12* (2013.01); *B32B 27/36* (2013.01);
(Continued)

(58) Field of Classification Search
None
See application file for complete search history.

(56) References Cited

U.S. PATENT DOCUMENTS 3,909,333 A * 9/1975 Eastman .................... 156/331.6
3,948,666 A * 4/1976 Kitanishi et al. ........... 430/271.1
(Continued)

FOREIGN PATENT DOCUMENTS

CN    1185170    6/1998
JP    1-292017   11/1989
(Continued)

OTHER PUBLICATIONS

Extended European Search Report is with respect to corresponding European Application No. 10841019.2, mail date is Jan. 15, 2014.
(Continued)

*Primary Examiner* — Vivian Chen
(74) *Attorney, Agent, or Firm* — Greenblum & Bernstein, P.L.C.

(57) ABSTRACT

The present invention has an object to provide a solvent-free polyester-based adhesive composition having good coatability and capable of forming an adhesive that shows good adhesion performance. The present invention provides a polyester-based adhesive composition containing a polyester having Mw of from $1 \times 10^3$ to $20 \times 10^3$ as a main component and a trifunctional or more polyepoxy compound as a crosslinking agent, and containing substantially no organic solvent. The molar number, $m_{OH}$, of hydroxyl group contained in a polyalcohol component constituting the polyester is from 0.5 to 0.98 times of the molar number, $m_{COOH}$, of carboxyl group contained in a polycarboxylic acid component. The composition has a viscosity at 23° C. of at most 80 Pa·s.

6 Claims, 2 Drawing Sheets

(51) Int. Cl.
| | | |
|---|---|---|
| C09J 167/08 | (2006.01) | |
| C08L 67/02 | (2006.01) | |
| C08L 67/08 | (2006.01) | |
| C08G 63/12 | (2006.01) | |
| C08G 63/16 | (2006.01) | |
| C08K 5/151 | (2006.01) | |
| C08K 5/1515 | (2006.01) | |
| B32B 27/36 | (2006.01) | |
| C09J 163/00 | (2006.01) | |
| C09J 167/00 | (2006.01) | |
| B32B 7/12 | (2006.01) | |
| B32B 7/04 | (2006.01) | |
| C08K 5/00 | (2006.01) | |
| C08K 5/3492 | (2006.01) | |

(52) U.S. Cl.
CPC ......... *B32B 2255/26* (2013.01); *B32B 2307/70* (2013.01); *B32B 2367/00* (2013.01); *C08G 63/12* (2013.01); *C08G 63/16* (2013.01); *C08K 5/0025* (2013.01); *C08K 5/151* (2013.01); *C08K 5/1515* (2013.01); *C08K 5/34926* (2013.01); *C08L 67/02* (2013.01); *C08L 67/08* (2013.01); *C09J 7/02* (2013.01); *C09J 2201/606* (2013.01); *C09J 2201/622* (2013.01); *C09J 2205/102* (2013.01); *C09J 2467/00* (2013.01); *Y10T 428/28* (2015.01); *Y10T 428/287* (2015.01); *Y10T 428/2852* (2015.01); *Y10T 428/31786* (2015.04); *Y10T 428/31794* (2015.04)

(56) References Cited

U.S. PATENT DOCUMENTS

| | | | | |
|---|---|---|---|---|
| 4,048,128 | A | * 9/1977 | Eastman | 524/147 |
| 4,713,428 | A | * 12/1987 | Mulhaupt et al. | 525/523 |
| 4,937,307 | A | * 6/1990 | Chung | 528/76 |
| 6,093,270 | A | 7/2000 | Ferencz et al. | |
| 7,858,733 | B2 | * 12/2010 | Bruchmann et al. | 528/296 |
| 2005/0165139 | A1 | * 7/2005 | Kawakami et al. | 524/17 |
| 2005/0250914 | A1 | * 11/2005 | Stumbe | C08G 83/005 525/437 |
| 2007/0213501 | A1 | * 9/2007 | Bruchmann et al. | 528/302 |
| 2008/0125567 | A1 | * 5/2008 | Ramaraju et al. | 528/302 |
| 2009/0280423 | A1 | * 11/2009 | Yahiro et al. | 430/108.4 |
| 2011/0091716 | A1 | * 4/2011 | Yoshie et al. | 428/317.3 |
| 2011/0135924 | A1 | * 6/2011 | Takahira et al. | 428/355 R |
| 2012/0202058 | A1 | * 8/2012 | Takahira et al. | 428/355 EN |
| 2015/0044460 | A1 | * 2/2015 | Yoshie | C09J 167/08 428/355 R |
| 2015/0050493 | A1 | * 2/2015 | Yoshie | C09J 171/02 428/355 R |
| 2015/0056446 | A1 | * 2/2015 | Ishiguro | C09J 167/02 428/355 R |

FOREIGN PATENT DOCUMENTS

| | | | |
|---|---|---|---|
| JP | 4-328186 | | 11/1992 |
| JP | 6-145633 | | 5/1994 |
| JP | 11-511774 | | 10/1999 |
| JP | 2001-279218 | | 10/2001 |
| JP | 2003-099749 | | 4/2003 |
| JP | 2003-321593 | A | 11/2003 |
| JP | 2004-35595 | | 2/2004 |
| JP | 2004-35596 | | 2/2004 |
| JP | 2006-111698 | A | 4/2006 |
| JP | 2007-045913 | * | 2/2007 |
| JP | 2007-070481 | A | 3/2007 |
| JP | 2007-270050 | | 10/2007 |
| JP | 2007-308626 | | 11/2007 |
| JP | 2008-231366 | | 10/2008 |
| JP | 2009-007544 | | 1/2009 |
| JP | 2010-095672 | * | 4/2010 |
| WO | 2008/069298 | | 6/2008 |
| WO | 2009-142272 | A1 | 11/2009 |

OTHER PUBLICATIONS

China Office action, mail date is Apr. 1, 2013.
International Preliminary Report on Patentability for International Application No. PCT/JP2010/073632, mail date is Mar. 8, 2011.
Search report from International Application No. PCT/JP2010/073632, mail date is Mar. 8, 2011.

* cited by examiner

POLYESTER ADHESIVE COMPOSITION

TECHNICAL FIELD

The present invention relates to an adhesive composition (polyester-based adhesive composition) comprising a polyester as a main component thereof.

BACKGROUND ART

A polyester-based adhesive (this may be referred to as a pressure-sensitive adhesive—the same shall apply hereinafter) is typically formed by applying a liquid composition (polyester-based adhesive composition), which has been prepared by dissolving or dispersing an adhesive-forming component containing a polyester and its crosslinking agent in an organic solvent, onto a substrate, followed by drying and curing (crosslinking) the composition. Recently, from the viewpoint of environmental considerations, production costs and others, the request for refraining from using organic solvents (this may be referred to as organic mediums) in the production process for adhesive compositions and/or pressure-sensitive adhesive sheets is increasing. A polyester-based adhesive composition does not indispensably require using an organic solvent in synthesis (through polycondensation) of the polyester, and is therefore expected to satisfy the above-mentioned requisition.

In general, however, a polyester suitable for the use for adhesives has a relatively high molecular weight and therefore the viscosity thereof in a temperature range around room temperature is too high for coating. Accordingly, in an ordinary conventional polyester-based adhesive composition, the polyester is diluted with an organic solvent to improve the coatability with the composition. A polyester having a lower molecular weight tends to have a lower viscosity, but in conventional technology, it has been difficult to realize an adhesive capable of exhibiting sufficient adhesion performance (especially adhesive force) by the use of a polyester having a low molecular weight to such a level that could attain good coatability even without diluted with an organic solvent.

Patent References 1 and 2 relate to a polyester-based adhesive composition and describe a technique that satisfies both coatability and adhesiveness of a solvent-free composition. However, the cured product (adhesive) formed of such composition is poor in tackiness (stickiness) in a room temperature range and therefore could not be pressure-bonded to an adherend (that is, could not produce adhesive force) at around room temperature, and accordingly, the composition is unsuitable to an adhesive.

CITATION LIST

Patent References

Patent Reference 1: JP-A 2004-35595
Patent Reference 2: JP-A 2004-35596

SUMMARY OF THE INVENTION

Problems that the Invention is to Solve

An object of the present invention is to provide a solvent-free polyester-based adhesive composition having good coatability and capable of forming an adhesive that shows good adhesion performance.

Means for Solving the Problems

The polyester-based adhesive composition disclosed here is a composition containing substantially no organic solvent and containing, as a main component thereof, a polyester having a weight-average molecular weight (Mw) of from $1 \times 10^3$ to $20 \times 10^3$, and containing a trifunctional or more polyepoxy compound as a crosslinking agent therein. Here, when the molar number, $m_{COOH}$, of the carboxyl group contained in the polycarboxylic acid component constituting the polyester is taken as 1, the molar number, $m_{OH}$, of the hydroxyl group contained in the polyalcohol component constituting the polyester is from 0.5 to 0.98 (that is, $m_{OH}/m_{COOH}$ is from 0.5 to 0.98). The viscosity at 23° C. of the adhesive composition is at most 80 Pa·s.

Such adhesive composition does not require dilution with an organic solvent and realizes good coatability even in a temperature range of around room temperature, since Mw of the polyester that is a main component thereof is relatively small and the viscosity at 23° C. of the composition is controlled to be not higher than a predetermined level. That is, in use of the adhesive composition (in coating), the composition does not require heating. Further, the composition employs a trifunctional or more polyepoxy compound as a crosslinking agent for the polyester having the above-mentioned Mw, therefore an adhesive excellent in adhesion performance (for example, adhesive force) can be formed. Further, since having $m_{OH}/m_{COOH}$ that falls within the above-mentioned range, the polyester can effectively promote the crosslinking reaction thereof with the polyepoxy compound.

Incidentally, "containing substantially no organic solvent" as referred to herein means that the adhesive composition does not contain an organic solvent to be intentionally added thereto for the purpose of lowering the viscosity of the composition (and therefore for the purpose of enhancing the coatability with the composition). Accordingly, the concept of "containing substantially no organic solvent" (this may be hereinafter referred to as "solvent-free") for the adhesive composition disclosed here can include an embodiment where the adhesive composition contains a small amount of an organic solvent inevitably having existed in the starting materials used in the production stage or an organic solvent unintentionally mixed during production. However, the amount of such an organic solvent that may be unintentionally contained in the adhesive composition is preferably at most 3 parts by mass, more preferably at most 1 part by mass, even more preferably at most 0.5 parts by mass, and still more preferably at most 0.1 parts by mass, relative to 100 parts by mass of the adhesive composition. The "polycarboxylic acid component" means one or more kinds of compounds selected from polycarboxylic acids having at least two carboxyl groups in one molecule and their derivatives; and the "polyalcohol component" means one or more kinds of compounds selected from polyalcohols having at least two hydroxyl groups in one molecule.

In one preferred embodiment of the technique disclosed here, the glass transition temperature (Tg) of the crosslinked adhesive formed from the adhesive composition is from −70° C. to −20° C. Such adhesive composition can form an adhesive having better adhesion properties.

In another preferred embodiment, the gel fraction of the crosslinked adhesive formed from the adhesive composition is from 30% to 95%. Such adhesive composition can form an adhesive having better adhesion properties.

As the polycarboxylic acid component constituting the polyester, an aliphatic dicarboxylic acid having a dimerized structure of an unsaturated fatty acid can be preferably employed. As the polyalcohol component constituting the polyester, an aliphatic diol having a structure where an aliphatic dicarboxylic acid of a dimerized unsaturated fatty acid is subjected to hydrogen-addition (hydrogenation) can be preferably employed. Such polyester can realize a pressure-sensitive adhesive sheet having higher performance. The unsaturated fatty acid (for example, unsaturated fatty acids having 18 carbon atoms) can be obtained from plants, and usableness of the aliphatic dicarboxylic acid and/or the aliphatic diol synthesized from the plant-derived starting material (unsaturated fatty acid), as the starting materials, is preferred from the viewpoint of environmental load reduction.

In one preferred embodiment of the technique disclosed here, the polyester is a polycondensate of a dimer acid with a dimer diol. The dimer acid and the dimer diol are typically those obtained derived from plants (in other words, they are plant-derived materials). The pressure-sensitive adhesive sheet that uses such polyester is preferred from the viewpoint of environmental load reduction.

According to the present invention, there is provided a pressure-sensitive adhesive sheet having a pressure-sensitive adhesive layer formed by crosslinking any of adhesive compositions disclosed here, on a substrate (as the case may be, on the releasable surface of a substrate having a releasable surface). The pressure-sensitive adhesive sheet can exhibit excellent adhesion performance (for example, adhesive force) and, in addition, has an advantage for reducing the evaporation amount of volatile organic compounds (VOC) from the pressure-sensitive adhesive sheet since it has the pressure-sensitive adhesive layer formed of the solvent-free adhesive composition. Accordingly, this sheet is preferred as pressure-sensitive adhesive sheets to be used in a relatively narrow, closed space, for example, in automobiles, or as pressure-sensitive adhesive sheets for indoor use such as those for home electrical appliances and OA (office automation) appliances. The pressure-sensitive adhesive sheet having the pressure-sensitive adhesive layer formed of the solvent-free adhesive composition is preferred from the viewpoint of environmental load reduction and working environment improvement in production of the pressure-sensitive adhesive sheet (in forming the pressure-sensitive adhesive layer).

MODE FOR CARRYING OUT THE INVENTION

Figure 1:
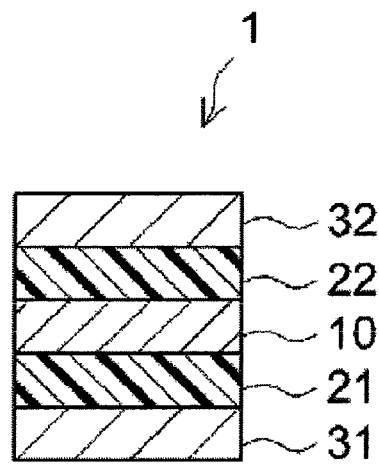
FIG. 1 is a cross-sectional view schematically showing one constitutive example of the pressure-sensitive adhesive sheet of the present invention.

Preferred embodiments for carrying out the present invention are described below. In this description, the matters that are the others than those specifically referred to herein and are the matters necessary for carrying out the present invention are understood as the matters that could be modified within workshop modification by anyone skilled in the art based on the background technique in the art. The present invention can be carried out on the basis of the contents disclosed in this description and the technical common sense in the art.

In this description, percentage and part all expressed by mass are the same as percentage and part to be expressed by weight.

The adhesive composition disclosed here comprises a polyester of which the weight-average molecular weight (Mw) is from $1.0 \times 10^3$ to $20 \times 10^3$, as a main component thereof (that is, as the component accounting for at least 50% by mass of the composition). When Mw of the polyester is excessively larger than the above range, the viscosity of the composition may increase and the coatability (especially the coatability in a temperature range around room temperature) thereof tends to be low. When Mw of the polyester is excessively smaller than the above range, the adhesion properties (for example, adhesive force) of the adhesive formed of the composition may tend to lower. In one preferred embodiment, Mw of the polyester is from $1.2 \times 10^3$ to $19 \times 10^3$, and more preferably from $1.5 \times 10^3$ to $18 \times 10^3$. In the embodiment, the coatability and the adhesion properties can be satisfied both on higher levels.

Mw of the polyester as referred to herein means a polystyrene-equivalent value as determined by analyzing a sample that is prepared by dissolving the polyester in a suitable solvent (for example, tetrahydrofuran), by means of gel permeation chromatography (GPC). Specifically, by performing GPC measurement under the condition shown in Examples described below, Mw of the polyester can be determined.

Typically, the polyester has a structure formed by condensation of one or two or more compounds (polycarboxylic acid component) selected from polycarboxylic acids having at least two carboxyl groups in one molecule and their derivatives with one or two or more compounds (polyalcohol component) selected from polyalcohols having at least two hydroxyl groups in one molecule. In the polyester in the technique disclosed here, when the molar number of the carboxyl group contained in the polycarboxylic acid component is represented by $m_{COOH}$ and when the molar number of the hydroxyl group contained in the polyalcohol component is represented by $m_{OH}$, the ratio $m_{OH}/m_{COOH}$ is from 0.5 to 0.98. When $m_{OH}/m_{COOH}$ is excessively larger than the above range, the crosslinking with the polyepoxy compound may become difficult and the adhesion properties (for example, heat resistance retention) of the adhesive may tend to lower. When $m_{OH}/m_{COOH}$ is excessively smaller than the range, the crosslinking density may become too high and the adhesion properties (for example, adhesive force) may tend to lower. In one preferred embodiment, $m_{OH}/m_{COOH}$ is from 0.6 to 0.9, and more preferably from 0.7 to 0.85. This embodiment can realize an adhesive composition that gives an adhesive of higher performance (for example, satisfying adhesive force and heat resistance retention both on higher levels).

The adhesive composition has a viscosity at 23° C. of at most 80 Pa·s, more preferably at most 70 Pa·s, and even more preferably at most 50 Pa·s. The composition having such viscosity has satisfactory flowability in a temperature range around room temperature and therefore, can be applied with ease on various substrates (which means including releasable substrates and non-releasable substrates) without requiring dilution with an organic solvent. Accordingly, in producing the pressure-sensitive adhesive sheet (in forming the pressure-sensitive adhesive layer), the environmental load can be reduced and the working environment can be improved. Further, coating with the adhesive composition containing substantially no organic solvent has another advantage in that any substrate (substrate that may bring about phenomena of dissolution, swelling, whitening and the like by contact with an organic solvent) that is desired not to be brought into contact with an organic solvent can be favorably employed as a substrate to be coated with the composition. In addition, the adhesive composition can be readily applied without requiring heating to a temperature range significantly higher than room temperature, and therefore, even a heat-labile substrate can be favorably employed as a substrate to be coated with the composition. In case where the adhesive composition is applied to a sheet-shaped substrate, the definition that the viscosity thereof at 23° C. is not higher than the above-mentioned value is of great significant. The lowermost limit of the viscosity thereof at 23° C. is not particularly limited, but in general, it is suitably at least 2 Pa·s, and more preferably at least 5 Pa·s.

The viscosity of the adhesive composition as referred to herein is the value as measured with a BH-type viscometer at a rotation number of 10 rpm. As the rotor (rotator) for the measurement, any suitable one can be selected depending on the viscosity of the sample. Typically, a rotor No. 4 is used. Specifically, the value obtained, for example, according to the viscosity measurement method described in Examples described below may be preferably employed as the viscosity at 23° C. of the adhesive composition in the technique disclosed herein.

In the technique disclosed herein, a trifunctional or more polyepoxy compound is used as a crosslinking agent for the above-mentioned polyester. The inventors have found that, in crosslinking with a polyisocyanate compound (isocyanate-based crosslinking agent) heretofore widely used as a crosslinking agent in the field of polyester-based adhesives, when Mw of the polyester is reduced to a degree of from $1.0 \times 10^3$ to $20 \times 10^3$ or so, the adhesion properties (especially adhesive force) rapidly lowers, but on the other hand, when a trifunctional or more polyepoxy compound is used as a crosslinking agent, surprisingly the adhesion properties hardly lower even though Mw of the polyester is reduced. Based on this finding, the inventors have further investigated and, as a result, have found that a solvent-free adhesive composition can realize coatability (especially coatability in a temperature range around room temperature) and adhesion properties both on high levels in a constitution of crosslinking a low-Mw polyester with a trifunctional or more polyepoxy compound.

As the trifunctional or more polyepoxy compound (hereinafter also referred to as a polyepoxy crosslinking agent) used as a crosslinking agent in the technique disclosed here, use can be made of various compounds having at least three epoxy groups (typically glycidyl groups) in one molecule. Specific examples thereof include 1,3-bis(N,N-diglycidylaminomethyl)cyclohexane, 1,3-bis(N,N-diglycidylaminomethyl)benzene, 1,3-bis(N,N-diglycidylaminomethyl)toluene, 1,3,5-triglycidylisocyanuric acid, N,N,N',N'-tetraglycidyl-m-xylenediamine, glycerin triglycidyl ether, and trimethylolpropane glycidyl ether. These polyepoxy compounds may be used either alone or in combination of two or more thereof. Particularly preferred crosslinking agents for use in the present invention are 1,3-bis(N,N-diglycidylaminomethyl)cyclohexane and 1,3,5-triglycidylisocyanuric acid.

The amount of the polyepoxy crosslinking agent used may be suitably controlled so that the adhesive formed by crosslinking the adhesive composition could realize the desired gel fraction (for example, from 30 to 95%, preferably from 40 to 80%). Not particularly limited, but the amount of the polyepoxy crosslinking agent used is, in general, suitably set within a range of from 0.5 to 20 parts by mass, preferably from 1 to 15 parts by mass, and more preferably from 1 to 10 parts by mass relative to 100 parts by mass of polyester. When the amount of the crosslinking agent used is too much relative to the amount of polyester, the adhesive force of the adhesive obtained after crosslinking may tend to lower. When the amount of the crosslinking agent used is too small, the cohesive force of the adhesive may be insufficient and the heat resistance retention thereof may tend to lower.

In carrying out the present invention, though it would be unnecessary to clarify the reason why the adhesion properties are hard to be impaired when the trifunctional or more polyepoxy compound is used as a crosslinking agent, even though Mw of the polyester is small. However, it may be considered that the reason is because, for example, the hydroxyl group to be generated through the crosslinking reaction of the epoxy group could contribute toward the adhesion properties (e.g., expression of adhesive force).

The adhesive composition disclosed here may contain, if desired, a crosslinking catalyst capable of promoting the crosslinking reaction with the above polyepoxy crosslinking agent. Use of the crosslinking catalyst can realize the effect of enhancing and stabilizing the quality (adhesion performance, etc.) of the pressure-sensitive adhesive sheet to be produced by the use of the adhesive composition. As the crosslinking catalyst, use can be made of various materials that are generally known to have the ability to increase the reactivity of epoxy group, for example, imidazoles, modified amines, polyfunctional phenols, mercaptans, acid anhydrides, etc without particular limitation. One example of preferred crosslinking catalysts includes imidazoles. Specific examples of such imidazoles are imidazole, 1-methylimidazole, 2-methylimidazole, 1,2-dimethylimidazole, and 2-phenylimidazole. Such crosslinking catalysts may be used either singly or in combination of two or more thereof.

The adhesive after crosslinked preferably has a glass transition temperature (Tg) within a range of from −70° C. to −20° C., and more preferably within a range of from −60° C. to −40° C. When Tg is excessively lower than the above range, cohesive force (and therefore heat resistance retention) of the adhesive may tend to lower. When Tg is excessively higher than the above range, adhesive force (especially the adhesive force in a temperature range around room temperature or lower) and tackiness of the adhesive may tend to lower.

Typically, the above Tg may be defined as the temperature that corresponds to the peak top of the loss elastic modulus G" in dynamic viscoelasticity measurement conducting under the condition of a frequency of 1 Hz. Specifically, for example, the value obtained according to the Tg measurement method described in Examples described below may be preferably employed as the Tg in the technique disclosed here.

In one preferred embodiment of the technique disclosed here, the adhesive after crosslinked has a gel fraction within a range of from 30 to 95%. Preferred is an adhesive composition that is constituted so as to give an adhesive having, after crosslinked (for example, after coated and held under the same condition as in Examples described below), the above gel fraction. Also preferred is a pressure-sensitive adhesive sheet that comprises the adhesive having the above gel fraction. When the gel fraction is excessively smaller than the above range, the cohesive force may be insufficient and the heat resistance (for example, heat resistance retention) may tend to lower. When the gel fraction is excessively larger than the range, the adhesive force may tend to lower. From the viewpoint of achieving adhesive force and cohesive force both on higher levels in a good balance, the gel fraction is more preferably from 40 to 80%, and even more preferably from 50 to 70%.

The measurement of the gel fraction may be performed according to the method described in Examples described below. As the porous sheet to be used for the measurement, a commercial product by Nitto Denko, "NITOFURON (registered trade name) NTF1122" or its corresponding products is preferably employed.

Typically, the polyester in the technique disclosed here has a structure formed by condensation of one or two or more compounds (polycarboxylic acid component) selected from polycarboxylic acids having at least two carboxyl groups in one molecule and their derivatives with one or two or more compounds (polyalcohol component) selected from polyalcohols having at least two hydroxyl groups in one molecule. As the polycarboxylic acid derivatives, use can be made of anhydrides, alkyl esters (including monoesters, diesters and others, and preferably esters with a monoalcohol having from 1 to 3 carbon atoms) or the like of the carboxylic acids.

As the constitutive element of the polycarboxylic acid component, use can be made of one or two or more selected from various known polycarboxylic acids and their derivatives generally used for polyester production. Polycarboxylic acids, which can be used preferably, include aliphatic or alicyclic dibasic acids and their derivatives (hereinafter these may be referred to as "aliphatic or alicyclic dicarboxylic acids"). Specific examples thereof include adipic acid, azelaic acid, dimer acid, sebacic acid, 1,4-cyclohexanedicarboxylic acid, 1,3-cyclohexanedicarboxylic acid, 1,2-cyclohexanedicarboxylic acid, 4-methyl-1,2-cyclohexanedicarboxylic acid, dodecenylsuccinic anhydride, fumaric acid, succinic acid, dodecanedioic acid, hexahydrophthalic anhydride, tetrahydrophthalic anhydride, maleic acid, maleic anhydride, itaconic acid, and citraconic acid.

From the viewpoint of environmental load reduction, materials not depending on petroleum (that is, non-petroleum materials), especially plant-derived materials are preferably employed as the constitutive element of the polycarboxylic acid component. This is advantageous in point of biomass degree improvement. As the plant-derived materials, dimer acid and sebacic acid are exemplified. "Dimer acid" as referred to herein means a dicarboxylic acid having a structure where unsaturated fatty acids are dimerized. Dicarboxylic acids having 36 carbon atoms and having a structure where unsaturated fatty acids (oleic acid, linolic acid, linoleic acid, etc.) having 18 carbon atoms are dimerized are typical examples falling within the scope of the dimer acid.

Other examples of the compound capable of being used as a constitutive element of the above polycarboxylic acid component include aromatic dibasic acids and their derivatives (anhydrides, alkyl esters, etc.—these may be hereinafter referred to as "aromatic dicarboxylic acids"). Specific examples of the aromatic dibasic acids include terephthalic acid, isophthalic acid, orthophthalic acid, 1,5-naphthalenedicarboxylic acid, 2,6-naphthalenedicarboxylic acid, 4,4'-diphenyldicarboxylic acid, 2,2'-diphenyldicarboxylic acid, and 4,4'-diphenylether-dicarboxylic acid.

The polycarboxylic acid component in the technique disclosed here, for example, may only contain one or two or more of compound that belongs to the aliphatic or alicyclic dicarboxylic acids, or may only contain one or two or more of compound that belongs to the aromatic dicarboxylic acids, or may contain both the aliphatic or alicyclic dicarboxylic acids and the aromatic dicarboxylic acids. In the technique disclosed here, use of the aliphatic or alicyclic dicarboxylic acids alone (for example, aliphatic dicarboxylic acids alone) as the polycarboxylic acid component can realize excellent results. As the case may be, the aliphatic or alicyclic dicarboxylic acids may be used as a main component (the component accounting for at least 50% by mass of the polycarboxylic acid component) and the aromatic dicarboxylic acids may be used in combination thereto in a degree not to significantly deteriorate the properties of the composition.

As the constitutive element of the polyalcohol component, use can be made of one or two or more selected from various known polyalcohols generally used for production of polyesters. Polyalcohols, which can be used preferably, include aliphatic or alicyclic diols. Specific examples thereof include ethylene glycol, 1,2-propylene glycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentylglycol, diethylene glycol, dipropylene glycol, 2,2,4-trimethyl-1,5-pentanediol, 2-ethyl-2-butylpropanediol, 1,9-nonanediol, 2-methyloctanediol, and 1,10-decanediol.

From the viewpoint of less environmental load, non-petroleum materials, especially plant-derived materials are preferably employed as the constitutive element of the polyalcohol component. As the plant-derived materials, dimer diol and 1,4-butanediol are exemplified. "Dimer diol" as referred to herein means a diol having a structure where carboxyl groups in a dicarboxylic acid of dimerized unsaturated fatty acids are converted (hydrogenated) into a hydroxyl group. Diols having 36 carbon atoms and corresponding to the dimers of unsaturated fatty acids (oleic acid, linolic acid, linoleic acid, etc.) having 18 carbon atoms are typical examples falling within the scope of the dimer diol.

As the polyester in the technique disclosed here, those not having any other crosslinkable functional groups than the functional groups at both ends (typically either of hydroxyl group and carboxyl group) are preferably used. The polyester produced by polycondensation of a dimer acid with a dimer diol is one preferred example that falls within the scope of the polyester having the structure.

The polyester in the technique disclosed here may be prepared by polycondensation of a polycarboxylic acid component with a polyalcohol component, like ordinary polyesters. More specifically, the condensation reaction of the carboxyl group provided from the polycarboxylic acid component with the hydroxyl group provided from the polyalcohol component is effected typically with removing water formed by the condensation reaction (condensation water) out of the reaction system, whereby the polyester can be produced (synthesized). As a method for removing the condensation water out of the reaction system, use can be made of a method of blowing an inert gas into the reaction system to take the condensation water out of the reaction system along with the inert gas, a method of distilling the condensation water away out of the reaction system under reduced pressure (reduced pressure method) or the like. The reduced pressure method is preferably employed since the polymerization time may be readily shortened and therefore it is suitable for improving the productivity.

The reaction temperature in the condensation reaction and the degree of pressure reduction (pressure in the reaction system) in the case of employing the reduced pressure method may be suitably set so that the polyester having the intended properties (Mw, viscosity, etc.) can be efficiently obtained. Not particularly limited, in general, the reaction temperature is suitably set to from 180° C. to 260° C., and is set to, for example, preferably from 200° C. to 220° C. When the reaction temperature is excessively lower than the above range, the polymerization speed may be low and the productivity may be impaired. On the other hand, when the reaction temperature is excessively higher than the above range, the formed polyester may be deteriorated. Also not particularly limited, in general, the degree of pressure reduction is suitably set to at most 10 kPa (typically from 10 kPa to 0.1 kPa), and is set to, for example, preferably from 4 kPa to 0.1 kPa. When the pressure in the reaction system is excessively high, the water formed by condensation reaction may be difficult to efficiently be distilled away out of the system, and the polymerization speed may be low. In case where the reaction temperature is relatively high, when the pressure in the reaction system is set to excessively low, even polycarboxylic acid and polyalcohol, which are the starting materials, may also be distilled away out of the system, which requires special attention. When the pressure in the reaction system is set to excessively low, the pressure would be difficult to attain and maintain, and therefore, in general, the pressure in the reaction system is suitably set to at least 0.1 kPa.

In the polycondensation reaction, a known or ordinary polymerization catalyst may be used like in synthesis of ordinary polyesters. Examples of the polymerization catalyst include various metal compounds such as titanium-based, germanium-based, antimony-based, tin-based, and zinc-based; and strong acids such as p-toluenesulfonic acid and sulfuric acid. Above all, preferred is use of titanium-based metal compounds (titanium compounds). Specific examples of the titanium compounds include titanium tetraalkoxides such as titanium tetrabutoxide, titanium tetraisopropoxide, titanium tetrapropoxide, and titanium tetraethoxide; octa-alkyl trititanate, hexa-alkyl dititanate, alkyl titanates, and titanium acetate.

The above process for synthesizing the polyester by condensation of a polycarboxylic acid component with a polyalcohol component can be carried out substantially without using an organic solvent (this means the exclusion of, for example, an embodiment of intentionally using an organic solvent as a reaction solvent for the above condensation reaction). Synthesis of polyester production substantially without using an organic solvent and production (preparation) of an adhesive composition using the polyester are preferable as satisfying the requirement of not using an organic solvent in production process of adhesive composition.

In the above condensation reaction, in general, there is a correlation between the molecular weight of the polyester to be synthesized by the condensation reaction and the viscosity of the reaction system, and therefore, based on this, Mw of the polyester can be controlled. For example, by continuously or intermittently measuring (monitoring) a torque of a stirrer or the viscosity of the reaction system during the condensation reaction, the polyester satisfying the intended Mw can be synthesized with accuracy.

The adhesive composition in the technique disclosed here may contain a polymer component (may be referred to as polymer P) other than the polyester as long as it does not significantly detract from the effect of the present invention. Examples of the polymer P include acrylic polymer, natural rubber-type polymer, synthetic rubber-type polymer, and silicone-based polymer. The polymer P excellent in compatibility with the polyester is preferably selected. In general, the content of the polymer P used is suitably at most 25% by mass and preferably at most 10% by mass, relative to 100% by mass of the polymer components contained in the entire adhesive composition (total amount of the polyester and the polymer P). The content of the polymer P is more preferably set to 5% by mass. One preferred embodiment of the adhesive composition disclosed here is an adhesive composition containing substantially no polymer P (that is, the polymer component is substantially composed of the above polyester alone).

If desired, the adhesive composition in the technique disclosed here can contain a tackifying resin. Any conventionally known tackifying resin can be used here without particular limitation. Example thereof include terpene-type tackifying resins, phenolic tackifying resins, rosin-type tackifying resins, aliphatic petroleum resins, aromatic petroleum resins, copolymer-type petroleum resins, alicyclic petroleum resins, xylene resins, epoxy-type tackifying resins, polyamide-type tackifying resins, ketone-type tackifying resins, and elastomer-type tackifying resins. Such tackifying resins may be used either singly or in combination of two or more thereof. From the viewpoint of biomass degree improvement, tackifying resins produced from plant-derived materials (for example, plant-derived rosin-type tackifying resins, terpene-type tackifying resins) is particularly preferably used.

The amount of the tackifying resin used is suitably at most 10 parts by mass (typically from 0.1 to 10 parts by mass), and preferably at most 5 parts by mass, relative to 100 parts by mass of the polyester. When the amount of the tackifying resin used is excessively large, the viscosity of the adhesive composition may increase or the compatibility with the polyester may be insufficient and the adhesive force of the composition may portend to be low.

In an embodiment of using the tackifying resin, a tackifying resin having a softening point of not lower than 40° C. is preferably used and a tackifying resin having a softening point of not lower than 60° C. is more preferably used, from the viewpoint of obtaining an adhesive excellent in heat resistance retention. From the viewpoint of compatibility with polyester and of viscosity of the adhesive composition, a tackifying resin having a softening point of not higher than 130° C. is preferred and a tackifying resin having a softening point of not higher than 100° C. is more preferred. As the case may be, the tackifying resin may not be used. One preferred embodiment of the technique disclosed here is an adhesive composition containing substantially no tackifying resin.

The adhesive composition disclosed here may contain, if desired, ordinary additives such as UV absorbent, light stabilizer, release regulator, plasticizer, softener, filler, colorant (pigment, dye, etc.), antiaging agent, and surfactant, within the range not significantly detracting from the effect of the present invention. Further, the adhesive composition disclosed here may contain any other crosslinking agent X (for example, difunctional epoxy compound, polyfunctional isocyanate, polyfunctional melamine compound, polyfunctional oxazoline compound, polyfunctional aziridine compound, and metal chelate compound) than trifunctional or more polyepoxy compounds, within the range not significantly detracting from the effect of the present invention. In case where such crosslinking agent X is used, its amount (by mass) used is preferably smaller than that of the trifunctional or more polyepoxy compound. An especially preferred embodiment of the adhesive composition disclosed here contains substantially only a trifunctional or more polyepoxy compound as a crosslinking agent therein. Another preferred embodiment of the adhesive composition contains substantially only a trifunctional or more polyepoxy compound and a small amount of a difunctional epoxy compound (typically in an amount of at most ⅕ by mass of the trifunctional or more polyepoxy compound), as a crosslinking agent therein.

In the present invention, the adhesive composition can be prepared by sequentially mixing the above-mentioned polyester and crosslinking agent, and optionally a crosslinking catalyst, a polymer component other than the polyester of the present invention, and a tackifying resin.

The pressure-sensitive adhesive sheet provided by the present invention comprises a pressure-sensitive adhesive layer formed by crosslinking any of the adhesive compositions disclosed here. The pressure-sensitive adhesive sheet may be a substrate-attached pressure-sensitive adhesive sheet of a form having the pressure-sensitive adhesive layer on one side of a sheet substrate (support), or a substrate-attached pressure-sensitive adhesive sheet of a form having the pressure-sensitive adhesive layer on both sides of a substrate (double-coated pressure-sensitive adhesive sheet, typically double-coated pressure-sensitive adhesive tape), or a substrate-less pressure-sensitive adhesive sheet of a form where the pressure-sensitive adhesive layer is supported by a release liner (a sheet substrate having releasable surface, or that is, understood as a release substrate). The concept of the pressure-sensitive adhesive sheet as referred to herein includes an pressure-sensitive adhesive tape, an pressure-sensitive adhesive label, an pressure-sensitive adhesive film, etc. The pressure-sensitive adhesive layer is typically formed continuously, to which, however, the present invention is not limited. For example, the pressure-sensitive adhesive layer may be formed as a regular or random pattern such as dot-like, stripe-like or other patterns. The pressure-sensitive adhesive sheet provided by the present invention may be in the form of rolls or sheets. The pressure-sensitive adhesive sheet may have a form processed into various shapes.

Figure 2:
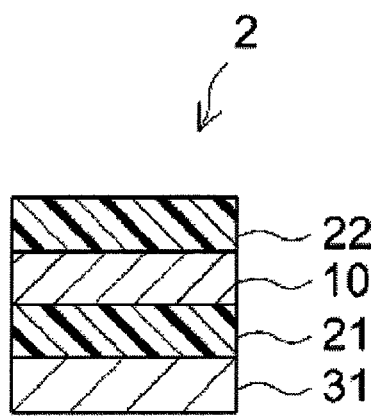
FIG. 2 is a cross-sectional view schematically showing another constitutive example of the pressure-sensitive adhesive sheet of the present invention.

The pressure-sensitive adhesive sheet disclosed here may have a cross-sectional structure schematically shown by FIG. 1 to FIG. 6 for example. Of those, FIG. 1 and FIG. 2 are constitutive examples of a substrate-attached, double-coated pressure-sensitive adhesive sheet. The pressure-sensitive adhesive sheet 1 shown in FIG. 1 has a constitution in which pressure-sensitive adhesive layers 21 and 22 are provided on both sides (both non-releasable) of a substrate 10, and the pressure-sensitive adhesive layers are protected with release liners 31 and 32, respectively, each having a releasable surface on at least the pressure-sensitive adhesive layer-facing side thereof. The pressure-sensitive adhesive sheet 2 shown in FIG. 2 has a constitution in which pressure-sensitive adhesive layers 21 and 22 are provided on both sides (both non-releasable) of a substrate 10, and one pressure-sensitive adhesive layer 21 is protected with a release liner 31 whose surfaces are both releasable. The pressure-sensitive adhesive sheet 2 of such a type can have a constitution where the other pressure-sensitive adhesive layer 22 is also protected with the release liner 31 by winding up the pressure-sensitive adhesive sheet 2 in such a manner that the pressure-sensitive adhesive layer 22 is brought into contact with the back of the release liner 31.

Figure 3:
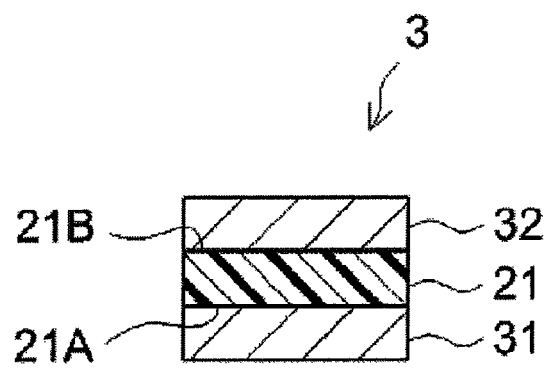
FIG. 3 is a cross-sectional view schematically showing another constitutive example of the pressure-sensitive adhesive sheet of the present invention.
Figure 4:
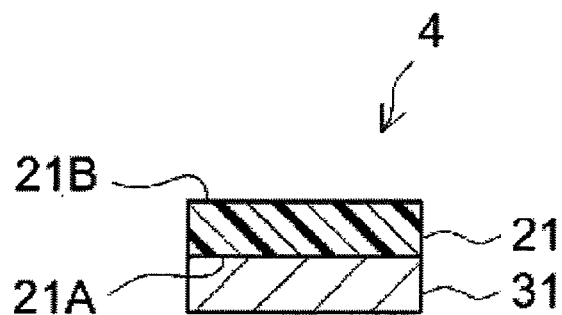
FIG. 4 is a cross-sectional view schematically showing another constitutive example of the pressure-sensitive adhesive sheet of the present invention.

FIG. 3 and FIG. 4 are constitutive examples of a substrate-less double-coated pressure-sensitive adhesive sheet. The pressure-sensitive adhesive sheet 3 shown in FIG. 3 has a constitution in which both surfaces 21A and 21B of a substrate-less pressure-sensitive adhesive layer 21 are protected with release liners (release substrates) 31 and 32 each of which at least the pressure-sensitive adhesive layer-facing side is a releasable surface. The pressure-sensitive adhesive sheet 4 shown in FIG. 4 has a constitution in which one surface 21A of a substrate-less pressure-sensitive adhesive layer 21 is protected with a release liner 31 of which both surfaces are releasable surfaces; and can have a constitution where the other side 21B is also protected by the release liner 31 by winding this up, to bring the other side 21B of the pressure-sensitive adhesive layer 21 into contact with the back of the release liner 31.

Figure 5:
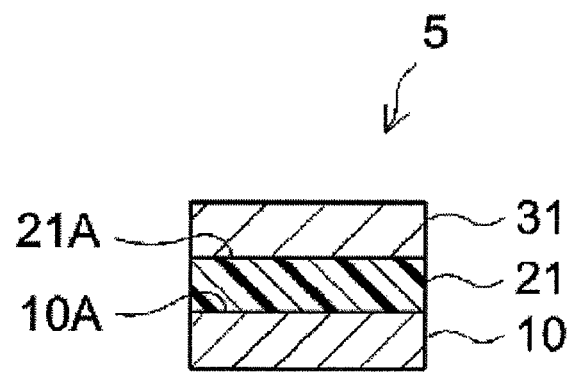
FIG. 5 is a cross-sectional view schematically showing another constitutive example of the pressure-sensitive adhesive sheet of the present invention.
Figure 6:
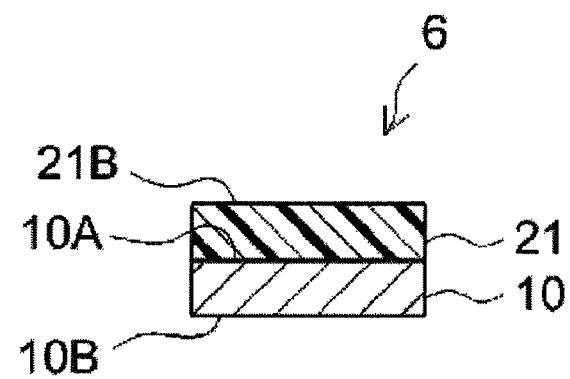
FIG. 6 is a cross-sectional view schematically showing another constitutive example of the pressure-sensitive adhesive sheet of the present invention.

FIG. 5 and FIG. 6 are constitutive examples of a substrate-attached single-coated pressure-sensitive adhesive sheet. The pressure-sensitive adhesive sheet 5 shown in FIG. 5 has a constitution in which a pressure-sensitive adhesive layer 21 is provided on one side 10A (non-releasable) of a substrate 10, and the surface (pressure-sensitive adhesive surface) 21A of the pressure-sensitive adhesive layer 21 is protected with a release liner 31 having a releasable surface on at least the pressure-sensitive adhesive layer-facing side thereof. The pressure-sensitive adhesive sheet 6 shown in FIG. 6 has a constitution in which a pressure-sensitive adhesive layer 21 is provided on one side 10A (non-releasable) of a substrate 10. The other side 10B of the substrate 10 is a releasable surface; and when the pressure-sensitive adhesive sheet 6 is wound up, the pressure-sensitive adhesive layer 21 is brought into contact with the other side 10B so that the surface (pressure-sensitive adhesive surface) 21B of the pressure-sensitive adhesive layer is protected by the other side 10B of the substrate.

The thickness of the pressure-sensitive adhesive layer is not particularly limited and may be suitably set in accordance with, for example, the use of the pressure-sensitive adhesive sheet. For example, the thickness of the pressure-sensitive adhesive layer may be set to from 1 μm to 1000 μm or so, and in general, it is preferably from 10 μm to 500 μm, more preferably from 20 μm to 300 μm or so, and even more preferably from 25 μm to 100 μm or so.

In case where the pressure-sensitive adhesive sheet disclosed here is provided with a substrate to support (line) the pressure-sensitive adhesive layer thereof, any conventionally known one may be used as the substrate. For example, use can be made of papers such as Japanese paper, kraft paper, glassine paper, high-quality paper, synthetic paper, and topcoated paper; fabrics such as woven fabrics or nonwoven fabrics of simple of blended fibrous materials (including natural fibers, semisynthetic fibers, and synthetic fibers) of, for example, cotton fibers, staple fibers, Manila fibers, pulp, rayon, acetate fibers, polyester fibers, polyvinyl alcohol fibers, polyamide fibers (nylon fibers), polyolefin fibers (polypropylene fibers, polyethylene fibers, etc.), and acrylic fibers; plastic substrates such as plastic films, porous plastic sheets or the like formed of various plastic materials such as polyolefins (low-density polyethylene, middle-density polyethylene, high-density polyethylene, linear low-density polyethylene, ethylene-a-olefin copolymer, ethylene-vinyl acetate copolymer, ethylene-ethyl acrylate copolymer, ethylene-methyl methacrylate copolymer, ethylene-n-butyl acrylate copolymer, propylene homopolymer, propylene random copolymer, propylene block copolymer, etc.), polyesters (polyethylene terephthalate, etc.), polyurethanes, vinyl chloride-based resins, vinyl acetate-based resins, polyimide-based resins, polyamide-based resins, fluororesins, and cellophanes; rubber sheets formed of natural rubber, butyl rubber, etc.; foam sheets formed of foams such as foam polyurethane and foam polychloroprene rubber; metal foils such as aluminium foil and copper foil; their composites, etc. The plastic films may be unstretched or stretched (mono-stretched or bi-stretched) ones. In case where the above porous plastic sheets or nonwoven fabrics are used as the substrate, a non-porous substrate such as a plastic film or sheet may be laminated on one side (typically on the side opposite to the side on which the pressure-sensitive adhesive layer is to be formed, that is, on the back) thereof.

The substrate may contain, if desired, various additives generally usable in ordinary substrates (supports) for a pressure-sensitive adhesive tape, such as filler (inorganic filler, organic filler, etc.), antiaging agent, antioxidant, UV absorbent, light stabilizer, antistatic agent, lubricant, plasticizer, and colorant (pigment, dye, etc.). The surface of the substrate (especially the surface on the side on which the pressure-sensitive adhesive layer is to be formed) may be subjected to an ordinary surface treatment useful for enhancing anchoring ability of the pressure-sensitive adhesive layer to the substrate, for example, oxidation treatment by chemical or physical process of chromate treatment, ozone exposure, flame exposure, high-pressure shock exposure, ionizing radiation treatment or the like; or with a coating treatment by an undercoat agent or the like. For imparting releasability to the pressure-sensitive adhesive layer, for example, the substrate may be subjected to a coating treatment (release treatment) by a release agent such as a silicone resin or a fluororesin, or the like (for lubrication).

The thickness of the substrate (support) may be suitably selected depending on the material or the form thereof, and may be, for example, from 1 μm to 1000 μm or so. In general, the thickness of the substrate is preferably from 2 μm to 500 μm, more preferably from 3 μm to 300 μm, further preferably from 5 μm to 250 μm, and particularly preferably from 10 μm to 200 μm.

The pressure-sensitive adhesive layer can be formed according to conventionally known production methods for pressure-sensitive adhesive sheets. For example, a method of directly applying an adhesive composition onto a non-releasable substrate (support), followed by crosslinking the composition to form a pressure-sensitive adhesive layer thereon (direct coating method); a method of applying an adhesive composition onto the releasable surface of a substrate (release liner) having a releasable surface, then crosslinking the composition to form a pressure-sensitive adhesive layer, and transferring the pressure-sensitive adhesive layer onto a non-releasable support (transfer method), etc. can be suitably employed. For the coating, use can be made of any conventionally known coater such as a gravure roll coater, a reverse roll coater, a kiss roll coater, a dip roll coater, a bar coater, a knife coater, and a spray coater.

The adhesive composition disclosed here can be well applied in a temperature environment at around room temperature (for example, 15° C. to 30° C. or so) without diluting with an organic solvent; however, the embodiment of using the composition is not limited to the embodiment not diluted with an organic solvent. That is, the present invention does not exclude an embodiment of applying the adhesive composition after suitably diluted with an organic solvent, if desired. Further, the adhesive composition disclosed here can be well applied in a temperature environment at around room temperature without diluting with an organic solvent and without requiring heating; however, the present invention does not exclude an embodiment of applying the composition optionally under heat (for example, by heating at 40° C. to 60° C. or so).

As the release liner, any conventionally known ones can be used without particular limitation. A release liner having a constitution where a surface of a substrate has been subjected to release treatment is preferably employed. As the substrate (substrate for release liner) constituting the release liner of this type, various plastic films (for example, plastic films made from thermoplastic resins of, for example, polyesters such as polyethylene terephthalate; polyolefins such as polypropylene and ethylene-propylene copolymer; and polyvinyl chloride), papers, fabrics, rubber sheets, foam sheets, metal foils, their composites (for example, laminate-structured sheets of paper laminated with olefin resin on both sides thereof), etc., can be selectively employed. The release treatment may be effected according to ordinary methods by using conventionally known or ordinary release agents (for example, silicone-based, fluorine-based or long-chain alkyl-based release agents). As the case may be, low-adhesive substrates of, for example, olefinic resins (for example, polyethylene, polypropylene, ethylene-propylene copolymer, polyethylene/polypropylene mixture), fluorine-based polymers (for example, polytetrafluoroethylene, polyvinylidene fluoride) or the like, may be used as a release liner without subjected to any release treatments on the surface thereof. Also, such low-adhesive substrates may be used after subjected to a release treatment. The structure of the substrate for release liner may be a single layer structure, or a laminate-structure of multiple layers. The thickness of the substrate for release liner may be suitably selected depending on the object thereof.

In one preferred embodiment of the pressure-sensitive adhesive sheet disclosed here, the SUS-adhering force thereof, as measured under the condition described in Examples described below, is at least 5 N/20 mm and more preferably at least 7 N/20 mm, and the heat resistance retention thereof is not lower than 70° C. and preferably not lower than 80° C. The pressure-sensitive adhesive sheet capable of being produced by the use of the solvent-free adhesive composition excellent in room temperature coatability and satisfying the adhesive force and the heat resistance retention both on high levels as above is preferably utilized in various fields.

EXAMPLES

Some experimental examples relating to the present invention are described below, but these are not intended to restrict the present invention to such concrete examples. Unless otherwise specifically indicated, "part" and "%" in the following description are all by mass. The properties in the following description were measured or evaluated according to the following methods.

[Weight-Average Molecular Weight (Mw)]

For each polyester, 0.01 g thereof was weighed, added to 10 g of tetrahydrofuran (THF), then allowed to stand for 24 hours and dissolved. The THF solution was analyzed for GPC by means of GPC apparatus, Model "HLC-8220GPC", manufactured by TOSOH under the condition mentioned below, thereby measuring the polystyrene-equivalent weight-average molecular weight (Mw) of the polyester.

GPC Condition:
Column: TSKgel $G6000H_6$, manufactured by TOSOH
Column size: inner diameter 7.5 mm×length 30.0 cm
Eluent: tetrahydrofuran
Flow rate: 0.300 mL/min
Column temperature: 40° C.
Detector: RI (differential refractometer)
Sample concentration: 0.1% by mass (THF solution)
Sample amount: 20 μL

[Viscosity]

In a measurement environment at 23° C., the viscosity of a sample conditioned at that temperature was measured with BH-type viscometer manufactured by TOKIMEC. For the measurement, 200 g of the sample was weighed in a beaker having a capacity of 300 mL, and using a rotor No. 4, the sample was analyzed under the condition of a rotor rotation number of 10 rpm.

[Glass Transition Temperature (Tg)]

Using the adhesive composition of each example, a disc specimen having a thickness of 3 mm and a diameter of 8 mm formed of the crosslinked adhesive was prepared. The dynamic viscoelasticity of the respective specimen was measured in a measuring temperature range of from −70° C. to 200° C., as given shear vibration at a frequency of 1 Hz, using dynamic viscoelasticity measuring instrument "ARES" manufactured by Rheometric Scientific, with a parallel plate.

From the result, the temperature corresponding to the peak top of the loss elastic modulus G" was taken as Tg of the crosslinked adhesive.

[Gel Fraction]

The pressure-sensitive adhesive sheet of respective example was cut into a size of 5 cm×5 cm along with the polyethylene terephthalate (PET) film. Only the pressure-sensitive adhesive layer (crosslinked adhesive sample) was taken out of it, wrapped with a tetrafluoroethylene resin-made porous sheet (average pore size 0.2 μm, thickness 0.2 mm) as cut in a suitable size (weight $W_a$ mg), and the weight of the obtained pack ($W_b$ mg) was measured. The pack was dipped in toluene and allowed to stand at 23° C. for 7 days, thereby extracting the toluene-soluble fraction from the crosslinked adhesive sample. Subsequently, the pack was picked up from toluene, dried at 120° C. for 2 hours, and the weight of the thus-dried, pack ($W_c$ mg) was measured. Each value was introduced into the following formula:

$$\text{Gel Fraction [\%]}=(W_c-W_a)/(W_b-W_a)\times 100,$$

whereby the gel fraction of the crosslinked adhesive was calculated. The tetrafluoroethylene resin-made porous sheet used above was trade name "NITOFURON (registered trade name) NTF1122", manufactured by Nitto Denko.

[Adhesive Force]

From the pressure-sensitive adhesive sheet of respective example, the PET film covering one side of the pressure-sensitive adhesive layer was removed to expose the pressure-sensitive adhesive surface. A PET film having a thickness of 25 μm, of which the surface had been subjected to corona-treatment, was attached to the pressure-sensitive adhesive surface for lining. The thus-lined pressure-sensitive adhesive sheet was cut into a strip having a width of 20 mm along with the PET film covering the other side of the pressure-sensitive adhesive layer, to thereby prepare a specimen. In an environment at a temperature of 23° C. and a relative humidity of 50%, the PET film covering the other side of the pressure-sensitive adhesive layer was removed from the specimen, and the exposed pressure-sensitive adhesive surface was adhered to a SUS304 stainless plate (adherend) under pressure by one back-and-forth rolling with a 2-kg roller thereon. In 30 minutes after the adhering (pressure-bonding), adhesive force (N/20 mm width) of the specimen to SUS was measured in accordance with JIS C 2107, in the condition under an environment at a temperature of 23° C. and a relative humidity of 50%, using a tensile tester, at a pulling rate of 300 mm/min, and at a pulling angle of 180° (180-degree peeling method).

[Heat Resistance Retention (Retention Temperature)]

From the pressure-sensitive adhesive sheet of respective example, the PET film covering one side of the pressure-sensitive adhesive layer was removed to expose the pressure-sensitive adhesive surface. An aluminum sheet having a thickness of 90 μm was attached to the pressure-sensitive adhesive surface for lining. The thus-lined pressure-sensitive adhesive sheet was cut into a size having a width of 10 mm and a length of 100 mm along with the PET film covering the other side of the pressure-sensitive adhesive layer, to thereby prepare three specimens from each example (that is, n=3). From the specimen, the PET film covering the other side of the pressure-sensitive adhesive layer was removed, and the thus-exposed pressure-sensitive adhesive surface was attached to a Bakelite plate (width 25 mm, length 125 mm, thickness 2 mm) as an adherend, in a contact area of 10 mm width×20 mm length, under pressure by one back-and-forth rolling with a 5-kg roller thereon. The specimen thus attached to the adherend was allowed to stand in a predetermined temperature condition for 30 minutes, then a load of 500 g was given to the free end of the specimen, and while given the load, the specimen was left in the same temperature condition for 1 hour. The test temperature was elevated from 40° C. at intervals of 10° C., and the highest temperature at which all the three specimens in each example were kept attached to the adherend for 1 hour was taken as the retention temperature of the pressure-sensitive adhesive sheet of the respective example.

[Coatability]

The adhesive composition (not diluted with an organic solvent) of each example was organoleptically evaluated for the coatability thereof at the time of application to a substrate at 23° C. Namely, when a uniform continuous coating film can be formed at the time of application, coatability was taken as A; but when formation of a continuous coating film is difficult or uniformity in a thickness of coating film is difficult, coatability was taken as B.

<Synthesis of Polyester A-1>

Into a reaction vessel equipped with a stirrer, a thermometer and an outflow condenser were charged 100 parts of a dimer diol (trade name, PRIPOL 2033, Mw 534, manufactured by Croda Japan), 192.7 parts of a dimer acid (trade name, PRIPOL 1009, Ww 566, manufactured by Croda Japan), and 0.1 parts of titanium tetraisopropoxide (manufactured by Wako Pure Chemicals, this is expressed as "Ti(OiPr)$_4$" in Table 1) a polymerization catalyst. The reaction vessel was depressurized to 1 kPa, heated to 200° C., kept at that temperature for 6 hours while distilling away the water formed with dehydration condensation reaction, thereby synthesizing a polyester A-1 ($m_{OH}/m_{COOH}$=0.55). Mw of the polyester was $2.0\times10^3$.

<Synthesis of Polyester A-2>

A polyester A-2 ($m_{OH}/m_{COOH}$=0.85) was synthesized in the same manner as that for the polyester A-1 except that the amount of the dimer acid charged was changed to 124.4 parts relative to 100 parts of the dimer diol. Mw was $17\times10^3$.

<Synthesis of Polyester A-3>

A polyester A-3 ($m_{OH}/m_{COOH}$=0.95) was synthesized in the same manner as that for the polyester A-1 except that the amount of the dimer acid charged was changed to 111.6 parts relative to 100 parts of the dimer diol. Mw was $19\times10^3$.

<Synthesis of Polyester A-4>

A polyester A-4 ($m_{OH}/m_{COOH}$=0.40) was synthesized in the same manner as that for the polyester A-1 except that the amount of the dimer acid charged was changed to 265.0 parts relative to 100 parts of the dimer diol. Mw was $0.9\times10^3$.

<Synthesis of Polyester A-5>

A polyester A-5 ($m_{OH}/m_{COOH}$=1.00) was synthesized in the same manner as that for the polyester A-1 except that the amount of the dimer acid charged was changed to 106.0 parts relative to 100 parts of the dimer diol. Mw was $42\times10^3$.

<Synthesis of Polyester A-6>

A polyester A-6 ($m_{OH}/m_{COOH}$=1.70) was synthesized in the same manner as that for the polyester A-1 except that the amount of the dimer acid charged was changed to 62.3 parts relative to 100 parts of the dimer diol. Mw was $7.0\times10^3$.

<Synthesis of Polyester A-7>

A polyester A-7 ($m_{OH}/m_{COOH}$=0.68) was synthesized in the same manner as that for the polyester A-1 except that the amount of the dimer acid charged was changed to 155.9 parts relative to 100 parts of the dimer diol. Mw was $7.2\times10^3$.

<Synthesis of Polyester A-8>

A polyester A-8 ($m_{OH}/m_{COOH}$=1.07) was synthesized in the same manner as that for the polyester A-1 except that the amount of the dimer acid charged was changed to 101.5 parts relative to 100 parts of the dimer diol. Mw was $50\times10^3$.

TABLE 1

|  |  | Polyester | | | | | | | |
|---|---|---|---|---|---|---|---|---|---|
|  |  | A-1 | A-2 | A-3 | A-4 | A-5 | A-6 | A-7 | A-8 |
| Charged Ratio [part] | Dimer Diol | 100 | 100 | 100 | 100 | 100 | 100 | 100 | 100 |
|  | Dimer Acid | 192.7 | 124.4 | 111.6 | 265.0 | 106.0 | 62.3 | 155.9 | 101.5 |
|  | Ti(OiPr)$_4$ | 0.1 | 0.1 | 0.1 | 0.1 | 0.1 | 0.1 | 0.1 | 0.1 |
|  | $m_{OH}/m_{COOH}$ | 0.55 | 0.85 | 0.95 | 0.40 | 1.00 | 1.70 | 0.68 | 1.07 |
|  | Mw [×10$^3$] | 2.0 | 17 | 19 | 0.9 | 42 | 7.0 | 7.2 | 50 |

Example 1

To 100 parts of the polyester A-1 were blended 6 parts of 1,3-bis(N,N-diglycidylaminomethyl)cyclohexane (trade name "TETRAD-C", manufactured by Mitsubishi Gas Chemical.—hereinafter this is expressed as EPO-1) as an epoxy crosslinking agent and 0.1 parts of imidazole (manufactured by Wako Pure Chemicals) as a crosslinking catalyst, to thereby prepare an adhesive composition. A polyethylene terephthalate (PET) film of which the surface had been subjected to a release treatment was prepared, and the above composition was applied onto the releasable surface of the PET film (substrate) to be 50 μm in thickness. The coating operation was carried out using an applicator in an environment at 23° C. The coated substrate was heated at 100° C. for 3 minutes, and kept in an environment at 50° C. for 3 days to effect crosslinking the composition, thereby forming a pressure-sensitive adhesive layer on the releasable surface of the PET film (substrate-less pressure-sensitive adhesive sheet).

Example 2

In Example 1, A-2 was used in place of the polyester A-1, and the amount of the epoxy crosslinking agent EPO-1 used was changed to 3 parts. The others were the same as in Example 1, thereby forming a pressure-sensitive adhesive sheet.

Example 3

In Example 1, A-3 was used in place of the polyester A-1, and the amount of the epoxy crosslinking agent EPO-1 used was changed to 8 parts. The others were the same as in Example 1, thereby forming a pressure-sensitive adhesive sheet.

Example 4

In Example 2, 6 parts of 1,3,5-triglycidylisocyanuric acid (trade name "TEPIC (registered trade name)", manufactured by Nissan Chemical Industry.—hereinafter this is referred to as EPO-2) was used in place of the epoxy crosslinking agent EPO-1. The others were the same as in Example 2, thereby producing a pressure-sensitive adhesive sheet.

Example 5

In Example 3, A-4 was used in place of the polyester A-3. The others were the same as in Example 3, thereby forming a pressure-sensitive adhesive sheet. In this Example, however, crosslinking was not progressed in the coating even after held in an atmosphere at 50° C. for 3 days, but was still in a state having fluidity. Therefore, in this, measurement of Tg and evaluation of the adhesive properties could not be conducted.

Example 6

In Example 3, A-5 was used in place of the polyester A-3. The others were the same as in Example 3, thereby forming a pressure-sensitive adhesive sheet. In this Example, however, the adhesive composition was highly viscous and could not form a continuous coating having uniform thickness on the releasable surface of the PET film. In addition, in this Example, crosslinking was not progressed in the coating even after held in an atmosphere at 50° C. for 3 days, but was still in a state having fluidity. Therefore, in this, measurement of Tg and evaluation of the adhesive properties could not be conducted.

Example 7

In Example 1, A-6 was used in place of the polyester A-1. In this, in addition, 12 parts of a polyisocyanate-based crosslinking agent (trade name "DURANATE TPA-100", manufactured by Asahi Kasei Chemicals, isocyanurate of hexamethylene diisocyanate.—this is hereinafter referred to as NCO-1) was used in place of the epoxy crosslinking agent EPO-1. Imidazole was not used. The others were the same as in Example 1, thereby producing a pressure-sensitive adhesive sheet.

Example 8

In Example 1, A-7 was used in place of the polyester A-1, and the amount of the epoxy crosslinking agent EPO-1 used was changed to 5 parts. The others were the same as in Example 1, thereby forming a pressure-sensitive adhesive sheet. The viscosity at 23° C. of the adhesive composition in Example 8 was not higher than 70 Pa·s, and was concretely 25 Pa·s. The viscosity at 23° C. of the adhesive composition in Examples 1 to 5 and Example 7 was not higher than 80 Pa·s (more specifically, not higher than 70 Pa·s). All these adhesive compositions of Examples 1 to 5 and Examples 7 and 8 were confirmed to have good coatability at 23° C.

Example 9

In Example 1, A-8 was used in place of the polyester A-1. In this, in addition, 3 parts of the polyisocyanate-based crosslinking agent NCO-1 was used in place of the epoxy crosslinking agent EPO-1. Imidazole was not used. The others were the same as in Example 1, thereby producing a pressure-sensitive adhesive sheet. In this Example, however, the adhesive composition was highly viscous and could not form a continuous coating having uniform thickness on the releasable surface of the PET film, and therefore in this, the composition was diluted with toluene to have a solid content (NV) of 50% and subjected to coating.

These pressure-sensitive adhesive sheets were analyzed for adhesive force and retention temperature, according to the above-mentioned methods. The obtained results are shown in Table 2 along with the results of Tg, gel fraction and coatability measured or evaluated according to the above-mentioned methods.

with an organic solvent, and therefore, favorably applied for a substrate that is desired not to be brought into contact with an organic solvent as a substrate to be applied with the composition.

TABLE 2

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Polyester [part] | | | | | | | | | |
| A-1 | 100 | | | | | | | | |
| A-2 | | 100 | | 100 | | | | | |
| A-3 | | | 100 | | | | | | |
| A-4 | | | | | 100 | | | | |
| A-5 | | | | | | 100 | | | |
| A-6 | | | | | | | 100 | | |
| A-7 | | | | | | | | 100 | |
| A-8 | | | | | | | | | 100 |
| Crosslinking Agent [part] | | | | | | | | | |
| EPO-1 | 6 | 3 | 8 | | 8 | 8 | | 5 | |
| EPO-2 | | | | 6 | | | | | |
| NCO-1 | | | | | | | 12 | | 3 |
| Imidazole [part] | 0.1 | 0.1 | 0.1 | 0.1 | 0.1 | 0.1 | | 0.1 | |
| Tg [° C.] | −47 | −47 | −47 | −47 | — | — | −47 | −47 | −47 |
| Gel Fraction [%] | 41 | 55 | 60 | 60 | 0 | 0 | 70 | 50 | 52 |
| Adhesive Force [N/20 mm] | 6 | 8 | 8 | 7 | — | — | 1 | 7 | 8 |
| Retention Temperature [° C.] | 80 | 80 | 80 | 80 | — | — | 80 | 80 | 80 |
| Coatability | A | A | A | A | A | B | A | A | B |

As shown in the above Table 2, the adhesive compositions of Examples 1 to 4 and Example 8, each comprising a polyester having Mw of from $1.0 \times 10^3$ to $20 \times 10^3$ and having $m_{OH}/m_{COOH}$ of from 0.5 to 0.98, and a trifunctional or more polyepoxy compound, all had good coatability at 23° C. and, after crosslinked, exhibited good adhesion performance.

As opposed to these, of the adhesive compositions of Example 6 and Example 9, in which Mw of the polyester was much higher than $20 \times 10^3$, the viscosity was too high (or that is, the viscosity was all much higher than 80 Pa·s), and therefore the coatability at 23° C. of the compositions with no solvent (or that is, not diluted with a solvent) was poor. In the adhesive compositions of Examples 5 and 6, $m_{OH}/m_{COOH}$ was too small or too large, and therefore crosslinking with the polyepoxy compound could not be suitably progressed. The pressure-sensitive adhesive sheet of Example 7, in which the polyester with Mw falling within a range of from $1.0 \times 10^3$ to $20 \times 10^3$ was crosslinked with the isocyanate-based crosslinking agent alone, has extremely low adhesive force.

While specific examples of the present invention have been described in detail above, they are merely examples and not intended to restrict the scope of claims. The technique described in the scope of claims includes a variously changed or modified one of these examples described above.

While the present invention has been described in detail and with reference to specific embodiments thereof, it will be apparent to one skilled in the art that various changes and modifications can be made therein without departing from the spirit and scope thereof. The present application is based on the Japanese Patent Application (No. JP 2009-298391) filed on Dec. 28, 2009, the content of which are incorporated hereto by reference.

Industrial Applicability

The polyester-based adhesive composition of the present invention can realize excellent coatability in a temperature region around room temperature without requiring dilution with an organic solvent, and therefore, favorably applied for a substrate that is desired not to be brought into contact with an organic solvent as a substrate to be applied with the composition.

Description of Reference Numerals and Signs 1, 2, 3, 4, 5, 6: Pressure-sensitive adhesive sheet
10: Substrate
21, 22: Pressure-sensitive adhesive layer
31, 32: Release liner

The invention claimed is:

1. An adhesive composition containing substantially no organic solvent,
wherein the composition is a polyester-based adhesive composition comprising a polyester having a weight-average molecular weight of from $1.0 \times 10^3$ to $20 \times 10^3$ as a main component thereof and a trifunctional or more polyepoxy compound as a crosslinking agent,
wherein, when the molar number, $m_{COOH}$, of carboxyl group contained in a polycarboxylic acid component constituting the polyester is taken as 1, the molar number, $m_{OH}$, of hydroxyl group contained in a polyalcohol component constituting the polyester is from 0.5 to 0.98,
wherein the composition has a viscosity at 23° C. of at most 80 Pa·s, and
wherein at least one polycarboxylic acid of the polycarboxylic acid component constituting the polyester is an aliphatic dicarboxylic acid having a dimerized structure of an unsaturated fatty acid.

2. The adhesive composition according to claim 1, wherein the adhesive formed by crosslinking the adhesive composition has a glass transition temperature of from −70° C. to −20° C.

3. The adhesive composition according to claim 1, wherein the adhesive formed by crosslinking the adhesive composition has a gel fraction of from 30% to 95%.

4. The adhesive composition according to claim 1, wherein at least one polyalcohol of the polyalcohol component constituting the polyester is an aliphatic diol having a structure where an aliphatic dicarboxylic acid of a dimerized unsaturated fatty acid is subjected to hydrogenation.

5. The adhesive composition according to claim 1, wherein the polyester is a polycondensate of a dimer acid with a dimer diol.

6. A pressure-sensitive adhesive sheet having a pressure-sensitive adhesive layer formed by crosslinking the adhesive composition according to claim 1, on a substrate.

* * * * *